United States Patent
Soloveichik

(10) Patent No.: US 8,338,055 B2
(45) Date of Patent: Dec. 25, 2012

(54) SYSTEM AND METHOD FOR ELECTROCHEMICAL ENERGY CONVERSION AND STORAGE

(75) Inventor: Grigorii Lev Soloveichik, Latham, NY (US)

(73) Assignee: General Electric Company, Niskayuna, NY (US)

(*) Notice: Subject to any disclaimer, the term of this patent is extended or adjusted under 35 U.S.C. 154(b) by 553 days.

(21) Appl. No.: 12/617,986

(22) Filed: Nov. 13, 2009

(65) Prior Publication Data

US 2010/0055513 A1    Mar. 4, 2010

Related U.S. Application Data

(63) Continuation-in-part of application No. 11/962,933, filed on Dec. 21, 2007.

(60) Provisional application No. 60/910,092, filed on Apr. 4, 2007.

(51) Int. Cl.
*H01M 8/22* (2006.01)
*H01M 8/18* (2006.01)

(52) U.S. Cl. ......... 429/506; 429/415; 429/418; 429/505

(58) Field of Classification Search .................. 429/505, 429/506, 415, 418
See application file for complete search history.

(56) References Cited

U.S. PATENT DOCUMENTS

| | | | |
|---|---|---|---|
| 2,019,883 A | 11/1935 | Wulff et al. | |
| 3,280,014 A | 10/1966 | Kordesch et al. | |
| 6,821,663 B2 * | 11/2004 | McElroy et al. | 429/418 |
| 2005/0002857 A1 * | 1/2005 | Pez et al. | 423/648.1 |

FOREIGN PATENT DOCUMENTS

JP    2001261301    * 9/2001

OTHER PUBLICATIONS

N. F. Grunenfelder et al., "Seasonal Storage of Hydrogen in Liquid Organic Hydrides: Description of the Second Prototype Vehicle," International Journal Hydrogen Energy, vol. 14, No. 8, p. 579-586, 1989.

H. Adkins et al., "The Selective Hydrogenation of Derivatives of Pyrrole, Indole, Carbazole and Acridine," Journal of American Chemical Society, vol. 63, pp. 1563-1570, 1940.

H. Dressler et al., "The Reduction of the Carbazole Nucleus. Some Derivatives of Hydrocarbazoles," Journal of Organic Chemistry, vol. 26, pp. 102-107, 1961.

A. Stanislaus et al., "Aromatic Hydrogenation Catalysis: A Review," Catalyst Review—Science Engineer, vol. 36, 1994, pp. 75-123.

M. Okimoto et al., "Electrochemical Dehydrogenation of 1,2,3,4-Tetrahydroioquinoline to 3,4- Dihydroisoquinoline," Heterocycles, vol. 65, No. 2, 2005, pp. 371-375.

(Continued)

*Primary Examiner* — Patrick Ryan
*Assistant Examiner* — Muhammad Siddiquee
(74) *Attorney, Agent, or Firm* — Andrew J. Caruso

(57) ABSTRACT

An electrochemical energy conversion and storage system comprises an electrochemical energy conversion device, in fluid communication with a source of an organic liquid carrier of hydrogen and an oxidant, for receiving, catalyzing and electrochemically oxidizing at least a portion of the hydrogen to generate electricity, a hydrogen depleted liquid, and water; and a vessel for receiving the hydrogen depleted liquid; wherein the organic liquid carrier of hydrogen comprises at least two secondary hydroxy groups is provided.

16 Claims, 2 Drawing Sheets

OTHER PUBLICATIONS

F. Montilla et al., "Electrochemical behaviour of benzene on platinum electrodes," Electrochimica Acta, Pergamon, vol. 45, 2000, pp. 4271-4277.

J. Luis et al., "A comparative study on the adsorption of benzyl alcohol, toluene and benzene on platinum," Electrochimica Acta, Pergamon, vol. 45, 2000, pp. 4279-4289.

W. An et al, The Electrochemical Hydrogenation of Edible Oils in a Solid Polymer Electrolyte Reactor. L. Reactor Design and Operation, Journal American Oil Chemical Society, vol. 75, No. 8, 1998, pp. 917-925.

P.N. Pintauro et al., "Electrochemical Hydrogenation of Soybean Oil with Hydrogen Gas," Industrial and Engineering Chemical Research, vol. 44, 2005, pp. 6188-6195.

N. Kariya et al, "Zero-CO2 emission and low-crossover 'rechargeable' PEM fuel cells using cyclohexane as an organic hydrogen reservoir," Chemical Communication, 2003, pp. 690-691.

N. Kariya et al., "Direct PEM fuel cell using "organic chemical hydrides" with zero-CO2 emission and low-crossover," Physical Chemistry Chemical Physics, vol. 8, 2006, pp. 1724-1730.

G. L. Soloveichik et al., "High Throughput Experiments in the Design and Optimization of Catalytic Packages for Direct Synthesis of Diphenylcarbonate," Catalysis of Organic Reactions, Department of Chemistry and Biochemistry Seton Hall University, vol. 104, 2005, Chapter 21, pp. 185-194.

* cited by examiner

SYSTEM AND METHOD FOR ELECTROCHEMICAL ENERGY CONVERSION AND STORAGE

CROSS REFERENCE TO RELATED APPLICATIONS

This application is a Continuation-in-Part of co-pending United States patent application entitled "METHOD AND APPARATUS FOR ELECTROCHEMICAL ENERGY CONVERSION" filed Dec. 21, 2007 and Ser. No. 11/962,933 which in turn claims priority from provisionally filed United States patent application entitled "HYDROGEN CARRIERS BASED ON AROMATIC NITROGEN CONTAINING HETEROCYCLIC COMPOUNDS" filed Apr. 4, 2007 and Ser. No. 60/910,092. In addition, this application is related to co-pending United States patent application entitled "METHOD AND APPARATUS FOR ELECTROCHEMICAL ENERGY CONVERSION" filed Jun. 22, 2007 and having a Ser. No. 11/766,970.

BACKGROUND

The invention relates generally to a system and a method for electrochemical energy conversion and storage and more specifically to materials, methods and apparatus of electrochemical energy conversion and storage using an organic liquid carrier of hydrogen.

Many electrochemical energy conversion and storage devices such as secondary batteries (e.g. lithium-ion batteries, nickel metal hydride batteries, sodium metal chloride batteries, etc.), electrochemical supercapacitors, and fuel cells are known. It is noted that the electrochemical supercapacitors have low energy density, while batteries are expensive and are not suitable for mobile and stationary applications.

Proton exchange membrane (PEM) based fuel cells are considered to be effective electricity generators for both stationary and mobile applications. PEM fuel cells electrochemically react air with an external supply of fuel to produce electricity and typically have an energy density that is greater than conventional electrochemical batteries. Typical fuel for a PEM fuel cell is hydrogen. Effective hydrogen storage remains a challenge, especially for mobile applications. High pressure or liquid hydrogen storage options are too expensive and typically have a low volumetric energy density. Current solid materials for hydrogen storage operating at temperatures below the typical operating temperatures of PEM fuel cells (100° C.) are currently capable of storing only about 4 weight percent and require a sophisticated heat management system that reduces total system capacity by about 50 percent or more. In addition such materials require total redesign of cars and refueling infrastructure. Liquid fuels like methanol also can be used in PEM fuel cells. However, these fuels generate $CO_2$ and CO that poisons the fuel cell catalyst. The most effective type of fuel for a PEM fuel cell is methanol that is a very toxic and highly flammable liquid. The use of a diluted methanol fuel reduces these risks but also substantially reduces the system energy density.

To improve the energy density of the PEM fuel cell system, many efforts are focused on improvement of the hydrogen storage subsystem. Some high capacity metal hydride options currently exist but they are either irreversible or work reversibly at much higher temperatures than the fuel cell operates. The recharge of these hydrides involves a high rate of heat dissipation and therefore additional components such as a heat exchanger.

Accordingly, there is a need in the art for an improved electrochemical energy conversion and storage system that overcomes some of the limitations of the current PEM fuel cells and hydrogen storage limitations.

BRIEF DESCRIPTION

In one aspect, the present invention provides an electrochemical energy conversion and storage system comprises an electrochemical energy conversion device, in fluid communication with a source of an organic liquid carrier of hydrogen and an oxidant, for receiving, catalyzing and electrochemically oxidizing at least a portion of the hydrogen to generate electricity, a hydrogen depleted liquid, and water; and a vessel for receiving the hydrogen depleted liquid; wherein the organic liquid carrier of hydrogen comprises at least two secondary hydroxy groups.

In another aspect, the present invention provides an electrochemical energy conversion and storage system comprising a storage tank for a source of organic liquid carrier of hydrogen; a PEM fuel cell; a vessel for receiving the hydrogen depleted liquid; and a recharging component for connecting the electrochemical conversion system to a source of electricity for rehydrogenating the hydrogen depleted liquid across the electrochemical energy conversion and a source of water. The PEM fuel cell comprises a solid electrolyte, in fluid communication with the storage tank and an oxidant, for receiving, catalyzing and electrochemically oxidizing at least a portion of the hydrogen to generate electricity, a hydrogen depleted liquid, and water. The organic liquid carrier of hydrogen comprises at least two secondary hydroxy groups.

In yet another aspect, the present invention provides a method of generating electricity comprising directing an organic liquid carrier of hydrogen comprising at least two secondary hydroxy groups to an electrochemical conversion device; and electrochemically dehydrogenating the organic liquid carrier of hydrogen in the presence of a catalyst and oxygen to produce electricity, water and a hydrogen depleted liquid.

In yet another aspect, the present invention provides method of storing electricity comprising directing a hydrogen depleted liquid to an electrochemical conversion device; supplying water to the electrochemical energy conversion device and electrifying the electrochemical conversion device to hydrogenate the hydrogen depleted liquid to provide an organic liquid carrier of hydrogen comprising at least two secondary hydroxy groups.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
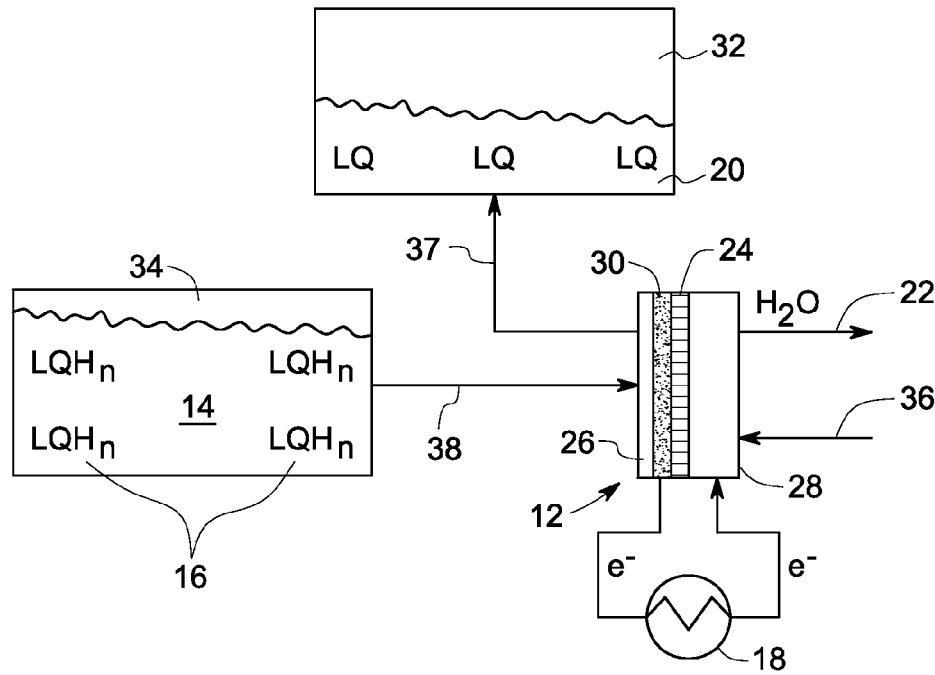
FIG. 1 is a schematic illustration of an embodiment of the instant invention.

One or more specific embodiments of the present invention are described herein. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC(CF$_3$)$_2$PhO—), 4-chloromethylphen-1-yl, 3-trifluorovinyl-2-thienyl, 3-trichloromethylphen-1-yl (i.e., 3-CCl$_3$Ph—), 4-(3-bromoprop-1-yl)phen-1-yl (i.e., 4-BrCH$_2$CH$_2$CH$_2$Ph—), and the like. Further examples of aromatic radicals include 4-allyloxyphen-1-oxy, 4-aminophen-1-yl (i.e., 4-H$_2$NPh—), 3-aminocarbonylphen-1-yl (i.e., NH$_2$COPh—), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e. —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph—), 4-mercaptomethylphen-1-yl (i.e., 4-HSCH$_2$Ph—), 4-methylthiophen-1-yl (i.e., 4-CH$_3$SPh—), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphen-1-yl, 4-vinylphen-1-yl, vinylidenebis (phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —C$_6$H$_{10}$C(CF$_3$)$_2$C$_6$H$_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$NC$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy) (i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy(2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis (cyclohexyl), and the like. The term "a C$_3$-C$_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH$_2$)$_9$—) is an example of a C$_1$ aliphatic radical.

An electrochemical energy conversion and storage system 10 comprises an electrochemical energy conversion device 12 in fluid communication with a source of an organic liquid carrier of hydrogen 14 (LQH$_n$) and an oxidant 36, typically air, purified oxygen or their mixture, as shown in FIG. 1. The electrochemical energy conversion device 12 receives, catalyzes and electrochemically oxidizes at least a portion of the hydrogen 16, contained in the organic liquid carrier of hydrogen LQH$_n$ 14, to generate electricity 18, a hydrogen depleted liquid LQ 20, and water 22. The hydrogen depleted liquid LQ 20 may include both fully hydrogen depleted liquids and partially hydrogen depleted liquids. While the appropriate organic liquid carrier of hydrogen 14 will vary from system to system, the selection process will typically be based on criteria such as the hydrogen storage capacity of the carrier, the rate and the energy of dehydrogenation of the carrier, the boiling point of the carrier and the overall cost of the carrier.

In one embodiment, the electrochemical energy conversion device 12 comprises a Proton Exchange Membrane (PEM) fuel cell. In one embodiment, the electrochemical energy conversion device 12 comprises a Proton Exchange Membrane (PEM) fuel cell that includes a solid electrolyte 24 that separates an anode portion 26 and a cathode portion 28. PEM fuel cell 12 further comprises a catalyst 30, typically disposed on the anodic side of the solid electrolyte 24, for accelerating the disassociating of the O—H and C—H bonds and oxidation of hydrogen 16 from the liquid carrier of hydrogen 14. In one embodiment, catalyst 30 comprises palladium, platinum, rhodium, ruthenium, nickel, cobalt, iron, copper and combinations thereof. In another embodiment, the catalyst 30 is a group VIII metal, such as finely dispersed metal alloys and transition metal complexes with multidentate P- or N-containing ligands (e.g. "pincer" type) on high-surface-area conductive supports like carbon or conductive polymers. In one embodiment, the catalyst 30 will be anchored to the anode portion 26 via formation of chemical bonds between the catalyst 30 and the anode portion 26, for example, by using functionalized silanes or by adsorption on a ligand-modified surface. In one embodiment, the system 10 may further comprise a catalyst material (not shown) on the cathode portion 28 to increase the electrochemical cell potential and improve the oxygen reduction reaction.

System 10 further comprises a vessel (also referred to sometimes as storage tank) 32 for receiving the hydrogen depleted liquid 20. In one embodiment, the source of the organic liquid carrier of hydrogen and the vessel for receiving the hydrogen depleted liquid include a liquid storage unit. In one embodiment, the liquid storage unit comprises a first compartment for an organic liquid carrier of hydrogen and a second compartment for hydrogen depleted liquid. The system 10 includes a fuel inlet line 38 which directs the organic liquid carrier of hydrogen 14 to the electrochemical energy conversion device 12. The hydrogen depleted liquid 20 is directed via a spent fuel outlet line 37 from the electrochemical energy conversion device 12 to the vessel for receiving the hydrogen depleted liquid.

The solid electrolyte 24 typically comprises a proton conducting membrane, for example Nafion®, which membrane is compatible with the liquid carrier of hydrogen 14 and the catalyst 30. In another embodiment, the solid electrolyte is a high-temperature membrane based on composites of proton-conductive ceramics, sulfonated polymers, phosphonated polymers and composites comprising a proton-conductive ceramic and a polymeric material (for example, sulfonated polysulfones or polybenzimidazoles). In addition to the oxidant 36, a quantity of water vapor may be directed into the system to keep the solid electrolyte 24 hydrated for better proton conductivity.

In various embodiments, the organic liquid carrier of hydrogen 14 comprises at least two secondary hydroxy groups. As used herein the term "secondary hydroxyl group" refers to hydroxy groups having structure (I)

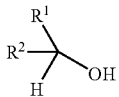
(I)

wherein $R^1$ and $R^2$ are organic radicals wherein at least one of $R^1$ and $R^2$ comprises a secondary hydroxy group. In one embodiment, the organic liquid carrier is an organic polyol having structure II and comprising at least two secondary hydroxy groups,

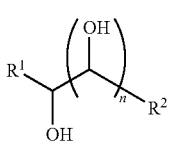
(II)

wherein $R^1$ and $R^2$ are independently a $C_1$-$C_6$ aliphatic radical, a $C_5$-$C_{12}$ cycloaliphatic radical or a $C_6$-$C_{12}$ aromatic radical and n is 1, 2 or 3.

In an alternate embodiment, the organic liquid carrier of hydrogen is an organic polyol having structure III and comprising at least two secondary hydroxy groups,

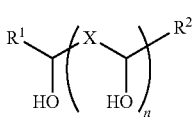
(III)

wherein $R^1$ and $R^2$ are independently a $C_1$-$C_6$ aliphatic radical, a $C_5$-$C_{12}$ cycloaliphatic radical or a $C_6$-$C_{12}$ aromatic radical; n is 1, 2, or 3; and X is a $CH_2$ group or an NH group.

In another embodiment, the organic liquid carrier of hydrogen is a five-member heterocyclic compound having structure IV and comprising at least two secondary hydroxy groups,

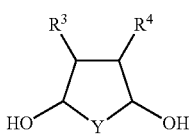
(IV)

wherein $R^3$ and $R^4$ are independently hydrogen, a $C_1$-$C_6$ aliphatic radical, a $C_5$-$C_{12}$ cycloaliphatic radical, or a $C_6$-$C_{12}$ aromatic radical; Y is a heteroatom is selected from the group consisting of oxygen and sulfur; or NH group.

In yet another embodiment, the organic liquid carrier of hydrogen is a six-member heterocyclic hydrocarbon having structure V

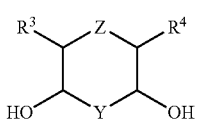
(V)

wherein $R^3$ and $R^4$ are independently hydrogen, a $C_1$-$C_6$ aliphatic radical, a $C_5$-$C_{12}$ cycloaliphatic radical, or a $C_6$-$C_{12}$ aromatic radical; Y is oxygen, sulfur, or NH; and Z is $CH_2$, oxygen, sulfur, or NH. In one embodiment, the organic liquid carrier of hydrogen comprises at least one compound is selected from the group consisting of polyols II, III, IV and V.

In one embodiment, the organic liquid carrier of hydrogen includes at least one compound selected from the group consisting of 2,3-butanediol, 2-,4-pentanediol, 2,5-hexanediol, 3,5-hexanediol, 3-methyl-2,4-pentanediol, 5,5-dimethyl-1,3-cyclohexanediol, 1,3-cyclohexanediol, 1,4-cyclohexanediol, heptane-2,4,6-triol, nonane-2,5,8-triol, 9,10-dihydroxy-9,10-dihydroanthracene, 3-methyltetrahydrofuran-2,5-diol, 3,4-di-methyltetrahydrofuran-2,5-diol, pyranol-2,4,6-triol, 3,5-dimethylpyranol-2,4,6-triol, thiotetrahydrofuran-2,5-diol, 1,4-dioxane-2,3,5-triol, and 1,4-dioxane-2,3,5,6-tetrol. In another embodiment, the organic liquid carrier of hydrogen comprises 2,3-butanediol, heptane-2,4,6-triol, pyranol-2,4,6-triol, 1,4-dioxane-2,3,5-triol, or a mixture thereof.

In yet another embodiment, the organic liquid carrier of hydrogen comprises at least one nitrogen atom. Suitable examples of nitrogen-containing organic liquid carriers of hydrogen include 1,1'-iminobisethanol, 1-(1-hydroxyethyl-methyl-amino)ethanol, 1,2-diaminoethane-1,2-diol, 1,3-diaminopropane-1,3-diol, 1,3-diaminopropane-1,2-diol, perhydro-N-carbamoylacetamide, 2-hydroxy-1,4-diaminobutane-1,4-diol, piperazine-2,3,5,6-tetrol, 1-methylpyrrolidine-2,3,4,5-tetrol, piperidine-2,3,4,5-tetrol, and perhydropyromellitic diimide.

In another embodiment, the organic liquid carrier of hydrogen is selected from the group consisting of 1,1'-iminobisethanol, 1,2-diaminoethane-1,2-diol, piperidine-2,3,4,5-tetrol, perhydropyromellitic diimide, and mixtures thereof.

In one embodiment, the organic liquid carrier of hydrogen is a polymeric polyol, for example polyvinyl alcohol. The term "polymeric" as used herein refers to a molecule that comprises repeating structural units and having a number average molecular weight of greater than 2000 grams per mole.

In some embodiments, the organic liquid carrier of hydrogen 14 may include certain additives to improve its flow characteristics or enhance the electrochemical reaction that occurs at the electrochemical energy conversion device 12. In one embodiment, the additive is inert to conditions prevailing within the electrochemical energy conversion device during operation. In one embodiment, the additive is a solvent which facilitates flow within the system.

In operation, the organic liquid carrier of hydrogen 14, is directed (typically from a tank 34 or the like) to the electrochemical energy conversion device 12, is electrochemically dehydrogenated in the presence of a catalyst to produce electricity 18 and a hydrogen depleted carbonyl compound 20. For example, where the organic liquid carrier of hydrogen has structure II, it is electrochemically dehydrogenated in the electrochemical energy conversion device to a hydrogen depleted carbonyl compound having, for example structure IIa

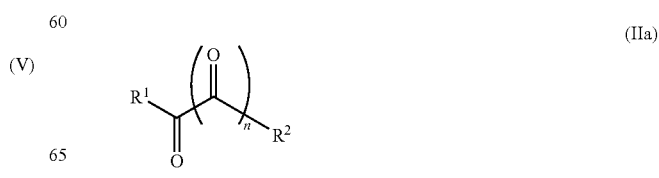
(IIa)

wherein $R^1$ and $R^2$ are independently a $C_1$-$C_6$ aliphatic radical, a $C_5$-$C_{12}$ cycloaliphatic radical or a $C_6$-$C_{12}$ aromatic radical and n is 1, 2 or 3. In one embodiment, the organic liquid carrier of hydrogen 14, comprises at least one compound selected from the group consisting of polyols II, III, IV and V. In operation, polyols such as compounds II, III, IV and V are electrochemically dehydrogenated in the presence of a catalyst to produce electricity 18 and a hydrogen depleted carbonyl compound 20. In one embodiment, the hydrogen depleted carbonyl compound 20 is selected from the group consisting of compounds IIa, IIIa, IVa, Va, and mixtures thereof.

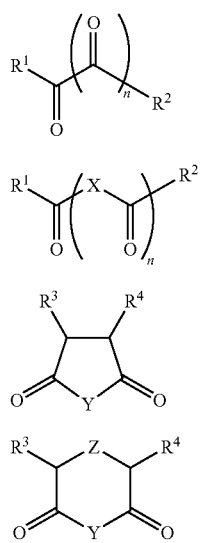

wherein $R^1$, $R^2$, $R^3$ and $R^4$ are independently a $C_1$-$C_6$ aliphatic radical, a $C_5$-$C_{12}$ cycloaliphatic radical or a $C_6$-$C_{12}$ aromatic radical; X is a $CH_2$ group or an NH group, Y is a heteroatom is selected from the group consisting of oxygen and sulfur; or Y is a NH group; Z is $CH_2$, oxygen, sulfur, or NH; and n is 1, 2 or 3.

As discussed above, several limitations exist in the current PEM fuel cell and hydrogen storage systems including the lack of a high-capacity hydrogen storage medium and the incompatibility of such systems with the existing fueling and transportation infrastructure. The current invention, however, provides a high-capacity energy storage solution, as the organic liquid carriers of hydrogen provided by the present invention exceed 6 wt % gravimetric hydrogen storage capacity and, which is more important for mobile applications, substantial (e.g. 54 g/L) volumetric capacity. At a capacity of 54 g/L hydrogen, a 20 gallon tank of an organic liquid carrier will provide about 5.4 kg equivalents of hydrogen, enough hydrogen, for example to power a passenger vehicle over a 300 mile drive. In addition, because the energy storage solution is based on an organic liquid carrier, the existing re-fueling and transportation infrastructure can be utilized without substantial modification.

Other benefits of the instant invention are that the electricity 18 is produced from the electrochemical energy conversion device 12 without the production of a hydrogen gas, making utilization and storage concerns, safety and size much easier to deal with. Furthermore, the hydrogen-depleted organic liquid 20 can be re-hydrogenated via on-board electrolysis (when used in a plug-in mode) or off-board (when used in a fuel cell vehicle mode). Thus, system 10 is both an attractive hydrogen storage solution and a high-capacity energy storage solution. Accordingly, this system provides a single hydrogen/energy storage solution for a combined plug-in electric and pure hydrogen fuel cell vehicles. As a hydrogen storage solution, the system 10 has the advantage of being able to use the existing re-fueling infrastructure. As a plug-in solution, the system 10 can be recharged at night, thus regenerating fuel cost effectively and easing the distribution of at least part of the overall energy for transportation via existing electrical grids instead of through fuel transportation and distribution networks.

Figure 2:
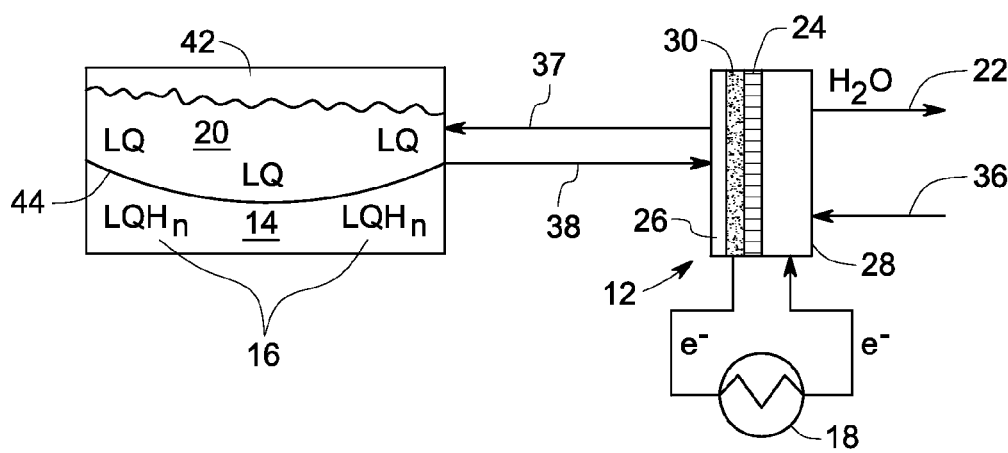
FIG. 2 is a schematic illustration of an embodiment of the instant invention.

Another embodiment of an electrochemical energy conversion system 40 is shown in FIG. 2. System 40 combines the two storage tanks required in system 10 and utilizes a single storage tank or vessel 42 comprising a separator 44, for example a membrane separator, that divides the storage tank or vessel 42 into multiple portions to store both the organic liquid carrier of hydrogen 14 and the hydrogen depleted liquid 20. In another embodiment, the membrane separator 44 is a flexible diaphragm. Such an arrangement makes the system 40 much more compact and efficient, especially in the re-fueling process. While the system 40 shows the liquid carrier of hydrogen 14 in a bottom portion of the storage tank 42 and the hydrogen depleted liquid 20 in a top portion of the storage tank 42, it is contemplated that those positions could be altered and potentially many other segmentation configurations would be within the spirit of this invention.

The chemistry underlying portions of the instant invention can be summarized as follows. Partial electro-oxidation of the organic liquid carrier of hydrogen 14, in the presence of an electrocatalyst 24 generates protons (Equation 1), where LQ stands for a hydrogen depleted organic carrier molecule.

$$LQ^*Hn \rightarrow LQ+nH++ne- \qquad (1)$$

Generated protons travel through the solid electrolyte 24 and combine with reduced oxygen at the cathode 28 to generate water 22 (Equation 2).

$$n/2\ O2+nH+ \rightarrow n/2\ H2O-ne- \qquad (2)$$

The total reaction is described by Equation 3.

$$LQ^*Hn+n/2\ O2 \rightarrow LQ+n/2\ H2O \qquad (3)$$

In these equations, all reactions are reversible, which allows the fuel cell to be used as an electrolyzer for recharging of the organic carrier. In the discharging mode, the cell is a flow battery in which high energy hydrogenated fuel is stored separately from the electrochemical cell thus increasing the system energy density. Known flow batteries (vanadium, zinc-bromine) with liquid electrolyte have flexible layouts, and high power and capacity but cannot be used for most applications, including mobile applications, due to the low energy density of the electrolyte (75-135 Wh/kg). The calculated energy densities of certain liquid carriers of hydrogen 14, such as organic liquid carriers are in the range between about 1250 to about 1750 Wh/kg. The use of a direct rechargeable fuel cell as a flow battery will make the energy density of the total hydrogen storage and utilization system close to the theoretical limit, and suitable for mobile applications.

The off-board hydrogenation of organic cyclic and heterocyclic molecules including ketones can be accomplished under relatively mild conditions (e.g. 80° C., 3-5 bar hydrogen for ketones) with the appropriate catalyst. Useful catalysts for this purpose include high surface area Raney Ni, supported palladium catalysts, and homogeneous ruthenium catalysts. Such catalysts are effective at reducing carbonyl compounds to the corresponding alcohols with both substrate conversion and catalyst turnover rates. However, dehydrogenation, the reverse reaction, is highly endothermic and strongly limited by thermodynamic equlibria. Catalytic thermal dehydrogenation of the organic liquid carrier of hydrogen comprising at least two secondary hydroxy groups usually requires higher temperature (150-250° C.) and has slow kinetics. Electrochemical dehydrogenation, as discussed in the current invention, however, can be conducted at lower temperatures and at higher rates.

To calculate the theoretical open circuit voltage (OCV) of an exemplary electrochemical energy conversion device 12 for different carriers, the ΔG (Gibbs energy) of reaction was used (3), as shown above. ΔG can be calculated from ΔG of two reactions (4 and 5). The parameters of hydrogen oxidation reaction are well known, and ΔG of reaction 4 is known for some molecules and can be estimated based on theoretical calculations for others. This approach gives OCV values for various organic carriers in the range between about 950 to about 1100 mV. The higher the heat of dehydrogenation, the lower the fuel cell OCV.

$$LQ*Hn \rightarrow LQ+n/2\ H_2 \qquad (4)$$

$$H_2 + \tfrac{1}{2} O_2 \rightarrow H_2O \qquad (5)$$

Figure 3:
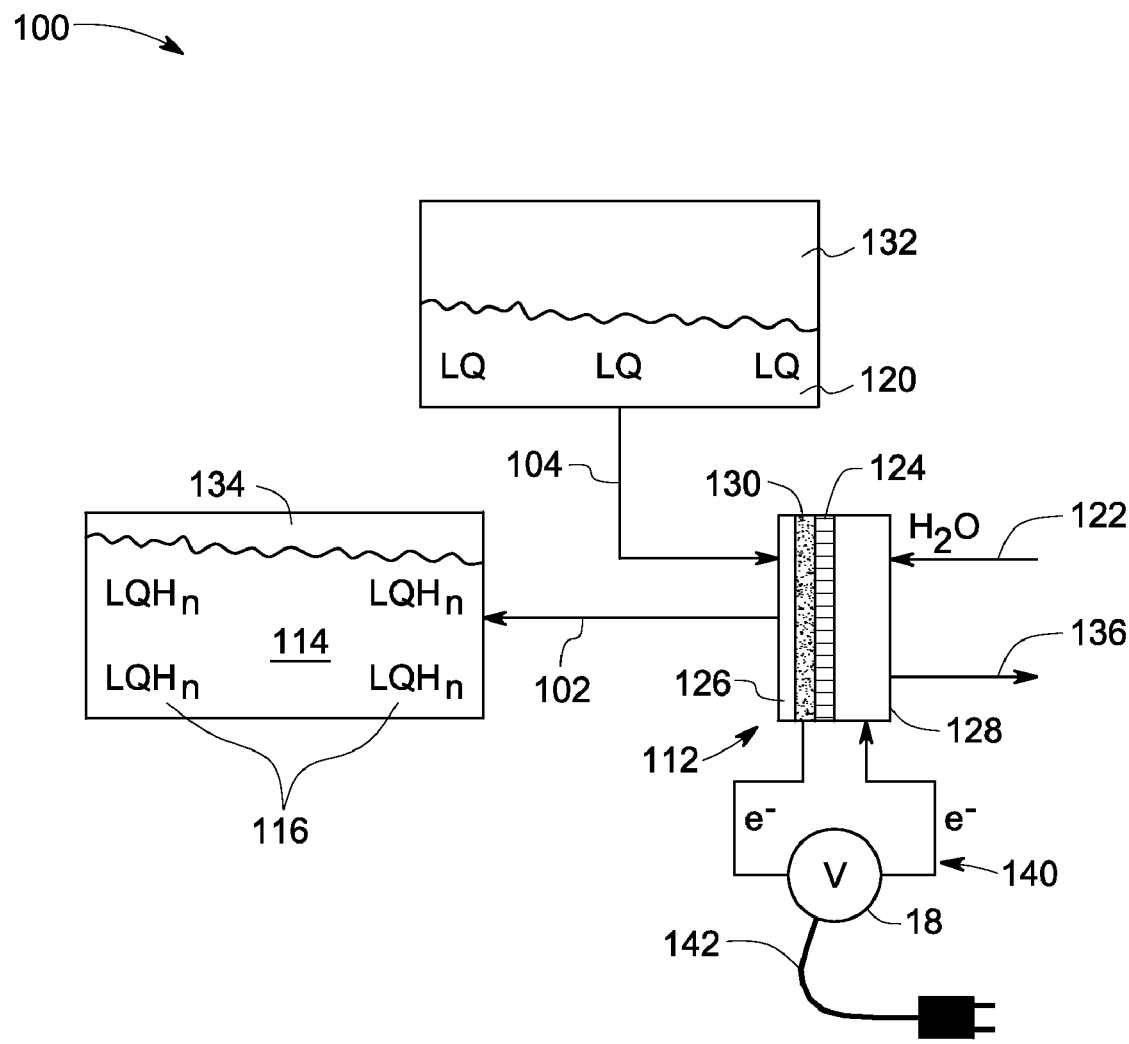
FIG. 3 is a schematic illustration of an embodiment of the instant invention.

In another embodiment of the instant invention, a rechargeable energy conversion system 100 is shown in FIG. 3. FIG. 3 shows the system of FIG. 1 being operated in a reverse mode. Rechargeable energy conversion system 100 further comprises a recharging component 140 that applies a voltage across the fuel cell and rehydrogenates the depleted liquid carrier 120 into the liquid carrier of hydrogen 116. The recharging component 140 is connected to a source of electricity (not shown) for example a wall outlet via an AC/DC inverter, a source of DC electricity, or an energy storage device or any other source of electricity typically via a plug 142 or other connection. In operation, the depleted liquid carrier 120, is directed (typically from a storage tank 132 or the like) to the electrochemical energy conversion device 112, via a spent fuel inlet line 104, where the depleted liquid carrier 120 is electrochemically hydrogenated in the presence of a catalyst and a source of water 122 (for example from an on-board storage tank or household source of water) to produce a rehydrogenated liquid carrier of hydrogen 114 and oxygen. In addition to an oxidant 136, a quantity of water vapor may be directed into the system to keep the solid electrolyte 124 hydrated for better proton conductivity. The rehydrogenated liquid carrier of hydrogen 114 is directed to the storage tank 134 through a fuel outlet line 102. In this embodiment, the electrochemical conversion device 112 operates as an electrolyzer, and electrochemically charges the depleted liquid carrier 120 using water electrolysis. The advantage of this electrochemical re-charging mode is that fuel can be regenerated cost effectively. Distribution of at least part of the overall energy for transportation can be supplied via existing electrical grids instead of transporting pure hydrogen, which is still a challenge.

EXAMPLE

The anode chamber of a PEM fuel cell having a platinum catalytic electrode is filled with a liquid containing the organic liquid carrier of hydrogen as shown in the Table 1-3 below. The cathode chamber of the PEM fuel cell is filled with oxygen as an oxidant at room temperature. During operation at an open circuit voltage of about 0.95 to about 1.1 Volt, the organic liquid carrier of hydrogen is catalytically split at the anode into protons, a hydrogen depleted organic liquid carrier and electrons. The protons generated at the anode chamber are combined with oxygen present at the cathode changer after passing through the proton exchange membrane. The electrons pass through the external circuit to form water and generate power. The organic liquid carrier of hydrogen is then replaced as needed.

Dehydrogenation energy of the organic liquid carriers of hydrogen, which defines the fuel cell open circuit voltage (OCV), have been calculated using standard density functional theory (DFT) using a B3LYP method with the 6-31G* basis set in the Spartan 2006 software package. The data on the analysis of physical properties and calculated dehydrogenation energy of selected organic liquid carriers of hydrogen are shown in Tables 1-3.

TABLE 1

Hydrogen Density and ΔG Dehydrogenation of Linear and Alicyclic Polyols as Organic Liquid Carrier of Hydrogen

|  | Hydrogenated Form | Dehydrogenated Form | Hydrogen Weight % | Vol. Density (g/L) | ΔG dehydrogenation (kCal/mole of Hydrogen) |
|---|---|---|---|---|---|
| CEx. 1 | Decaline | Naphtalene | 7.29 | 65.3 | 20.6 |
| CEx. 2 | Dehydro-N-ethylcarbazole | N-Ethylcarbazole | 5.83 | 64.2 | 16.2 |
| CEx. 3 | 2-Propanol | Acetone | 3.35 | 26.4 | 13.9 |
| Ex. 1 | 2,3-Butanediol | Diacetyl | 4.47 | 44.2 | 15.2 |
| Ex. 2 | 2,4-Pentanediol | Acetylacetone | 3.87 | 37.2 | 14.2 |
| Ex. 3 | 2,5-Hexanediol | hexane-2,5-dione | 3.41 | 33.1 | 12.8 |
| Ex. 4 | 3,5-Hexanediol | 1-methylacetylacetone | 3.41 | 33.1 | 14.9 |
| Ex. 5 | 3-Methyl-2,4-pentanediol | 3-methylacetylacetone | 3.41 | n/a | 13.1 |
| Ex. 6 | 5,5-Dimethyl-1,3-cyclohexanediol | Dimedone | 2.80 | n/a | 13.9 |
| Ex. 7 | 1,3-Cyclohexanediol (trans) | 1,3-cyclohexanedione | 3.47 | 40.1 | 14.9 |
| Ex. 8 | 1,3-Cyclohexanediol (cis) | 1,3-cyclohexanedione | 3.47 | 40.1 | 14.9 |
| Ex. 9 | 1,4-Cyclohexanediol trans (quinitol) | 1,4-cyclohexanedione | 3.47 | 40.6 | 15.8 |

TABLE 1-continued

Hydrogen Density and ΔG Dehydrogenation of Linear and Alicyclic Polyols as Organic Liquid Carrier of Hydrogen

|  | Hydrogenated Form | Dehydrogenated Form | Hydrogen Weight % | Vol. Density (g/L) | ΔG dehydrogenation (kCal/mole of Hydrogen) |
|---|---|---|---|---|---|
| Ex. 10 | 1,4-Cyclohexanediol (cis) | 1,4-cyclohexanedione | 3.47 | 40.6 | 15.6 |
| Ex. 11 | Heptane-2,4,6-triol | heptane-2,4,6-trione (diacetylacetone) | 4.08 | 45.8 | 13.9 |
| Ex. 12 | 3,5-Dimethyl-2,4,6-heptanetriol | 3,5-dimethyl-2,4,6-heptanetrione | 3.43 | n/a | 14.6 |
| Ex. 13 | Nonane-2,5,8-triol | nonane-2,5,8-trione | 3.43 | n/a | 12.9 |
| Ex. 14 | 3-Ethylhydroxypentane-2,5-diol | Triacetylmethane | 4.08 | n/a | 13.6 |
| Ex. 15 | 9,10-Dihydroxy-9,10-dihydroanthracene | Anthraquinone | 1.98 | n/a | 5.2 |

* n/a = data not available

It may be observed from Table 1 that the compounds having at least two secondary hydroxyl groups as the organic liquid carrier of hydrogen have lower dehydrogenation energy than cyclic hydrocarbons as the organic liquid carrier of hydrogen (CEx.1 and CEx.2). In addition, the compounds having at least two secondary hydroxyl groups as the organic liquid carrier of hydrogen have a higher hydrogen and energy density than that of compounds having single hydroxyl group as the organic liquid carrier of hydrogen (CEx.3). The gravimetric hydrogen capacity of compounds having at least two secondary hydroxyl groups as the organic liquid carrier of hydrogen is typically lower than the capacity of cyclic hydrocarbons hydrocarbons as the organic liquid carrier of hydrogen. However, the higher density compounds having at least two secondary hydroxyl groups as the organic liquid carrier of hydrogen provides higher volumetric hydrogen capacity, which is required for mobile energy storage.

TABLE 2

Hydrogen Density and ΔG Dehydrogenation of Heterocyclic Polyols as Organic Liquid Carrier of Hydrogen

|  | Hydrogenated Form | Dehydrogenated Form | Hydrogen Weight % | Vol. Density (g/L) | ΔG dehydrogenation (kCal/mole of Hydrogen) |
|---|---|---|---|---|---|
| Ex. 15 | 3-Methyltetrahydrofuran-2,5-diol | 3-Methylfuran-2,5-dione | 5.12 | n/a | −14.8 |
| Ex. 16 | 3,4-Di-methyltetrahydrofuran-2,5-diol | 3,4-Dimethylfuran-2,5-dione | 4.58 | n/a | −12.4 |
| Ex. 17 | Pyranol-2,4,6-triol | Pyranol-2,4,6-trione | 4.51 | 68.1 | −10.8 |
| Ex. 18 | 3,5-Dimethylpyranol-2,4,6-triol | 3,5-Dimethylpyranol-2,4,6-trione | 3.78 | n/a | −10.5 |
| Ex. 19 | Thiotetrahydrofuran-2,5-diol | Thiofuran-2,5-dione | 5.04 | n/a | −17.2 |
| Ex. 20 | Perhydropyromellitic dianhydride | Pyromellitic dianhydride | 6.08 | n/a | −12.0 |
| Ex. 21 | 1,4-Dioxane-2,3,5-triol | 1,4-Dioxane-2,3,5-trione | 4.44 | 76.0 | −10.8 |
| Ex. 22 | 1,4-Dioxane-2,3,5,6-tetrol | 1,4-Dioxane-2,3,5,6-tetrone | 5.30 | n/a | −12.9 |

TABLE 3

Hydrogen Density and ΔG Dehydrogenation of Amino Alcohols as Organic Liquid Carrier of Hydrogen

|  | Hydrogenated Form | Dehydrogenated Form | Hydrogen Weight % | Vol. Density (g/L) | ΔG dehydrogenation (kCal/mole of Hydrogen) |
|---|---|---|---|---|---|
| Ex. 23 | 1,1'-Iminobisethanol | N-Acetacetamide | 5.23 | n/a | 5.0 |
| Ex. 24 | 1-(1-Hydroxyethyl-methyl-amino)ethanol | N-Methyl-N-acetylacetamide | 4.42 | 46.2 | 5.8 |

TABLE 3-continued

Hydrogen Density and ΔG Dehydrogenation of Amino Alcohols as Organic Liquid Carrier of Hydrogen

| | Hydrogenated Form | Dehydrogenated Form | Hydrogen Weight % | Vol. Density (g/L) | ΔG dehydrogenation (kCal/mole of Hydrogen) |
|---|---|---|---|---|---|
| Ex. 25 | 1,2-Diaminoethane-1,2-diol | Oxamide | 4.47 | 63.7 | −4.9 |
| Ex. 26 | 1,3-Diaminopropane-1,3-diol | Propanediamide | 3.80 | 49.4 | −2.4 |
| Ex. 27 | 1,3-Diaminopropane-1,2-diol | 1,3-Diaminopropane-1,2-dione | 3.80 | 49.7 | 9.8 |
| Ex. 28 | Perhydro-N-carbamoylacetamide | N-Carbamoylacetamide | 3.80 | n/a | 2.3 |
| Ex. 29 | 2-Hydroxy-1,4-diaminobutane-1,4-diol | 2-Oxopentanediamide | 4.03 | 53.5 | 4.6 |
| Ex. 30 | Piperazine-2,3,5,6-tetrol | Piperazine-2,3,5,6-tetrone | 5.37 | 93.2 | 6.3 |
| Ex. 31 | 1-Methylpyrrolidine-2,3,4,5-tetrol | 1-Methylpyrrolidine-2,3,4,5-tetrone | 5.41 | n/a | 14.9 |
| Ex. 32 | Piperidine-2,3,4,5-tetrol | Piperidine-2,3,4,5-tetrone | 5.41 | 89.1 | 18.7 |
| Ex. 33 | 1-(1-Hydroxyethylamino)ethanol | N-Acetylacetamide | 3.83 | 40.6 | 5.0 |
| Ex. 34 | 1-(1-Hydroxyethyl-methyl-amino)ethanol | N-Acetyl-N-methyl-acetamide | 3.38 | 35.3 | 5.8 |
| Ex. 35 | 1H-Tetrahydropyrrole-2,5-diol | 1H-Pyrrole-2,5-dione (maleimide) | 5.86 | 76.8 | 12.4 |
| Ex. 36 | Perhydropyromellitic diimide | Pyromellitic diimide | 6.13 | n/a | 8.8 |

It may be seen from Table 2 that the replacement of $CH_2$ group for oxygen heteroatom in the heterocyclic polyols used as organic liquid carrier of hydrogen further decreases dehydrogenation energy and increases volumetric hydrogen capacity. However, the dehydrogenation energy is increased when the heteroatom is sulfur (Ex. 19). When amino alcohols are used as organic liquid carrier of hydrogen, the presence of nitrogen heteroatom in linear and cyclic polyols in the position next to hydroxy groups gives beneficial properties (Table 3).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An electrochemical energy conversion and storage system comprising:
   an electrochemical energy conversion device, in fluid communication with a source of an organic liquid carrier of hydrogen and an oxidant, for receiving, catalyzing and electrochemically oxidizing at least a portion of the hydrogen to generate electricity, a hydrogen depleted liquid, and water; and
   a vessel for receiving the hydrogen depleted liquid;
   wherein the organic liquid carrier of hydrogen comprises at least two secondary hydroxy groups represented by the following structure

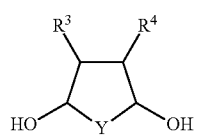

wherein $R^3$ and $R^4$ are independently hydrogen, a $C_1$-$C_6$ aliphatic radical, a $C_5$-$C_{12}$ cycloaliphatic radical, or a $C_6$-$C_{12}$ aromatic radical; and Y is oxygen, sulfur or NH.

2. An electrochemical energy conversion system in accordance with claim 1, wherein the source of the organic liquid carrier of hydrogen and the vessel for receiving the hydrogen depleted liquid comprise a liquid storage unit.

3. An electrochemical energy conversion system in accordance with claim 2, wherein the liquid storage unit comprises a first compartment for an organic liquid carrier of hydrogen and a second compartment for hydrogen depleted liquid.

4. An electrochemical energy conversion system in accordance with claim 1, wherein the organic liquid carrier of hydrogen comprises at least one non-hydroxyl heteroatom.

5. An electrochemical energy conversion system in accordance with claim 1, wherein the organic liquid carrier of hydrogen comprises at least one compound having structure IV

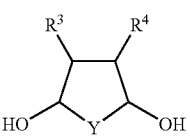

(IV)

wherein $R^3$ and $R^4$ are independently hydrogen, a $C_1$-$C_6$ aliphatic radical, a $C_5$-$C_{12}$ cycloaliphatic radical, or a $C_6$-$C_{12}$ aromatic radical; and Y is oxygen, sulfur or NH.

6. An electrochemical energy conversion system in accordance with claim 1, wherein the organic liquid carrier of hydrogen comprises nitrogen.

7. An electrochemical energy conversion system in accordance with claim 1, wherein the organic liquid carrier of hydrogen further comprises an inert additive to facilitate liquid flow within the system.

8. An electrochemical energy conversion system in accordance with claim 1, wherein the organic liquid carrier of hydrogen further comprises an additive to enhance the electrochemical reaction.

9. An electrochemical energy conversion system in accordance with claim 1, wherein the electrochemical energy conversion device is a PEM fuel cell.

10. An electrochemical energy conversion system in accordance with claim 1, further comprising a catalyst.

11. An electrochemical energy conversion system in accordance with claim 1, further comprising a recharging component for connecting the electrochemical conversion system to a source of electricity for rehydrogenating the hydrogen depleted liquid across the electrochemical energy conversion device.

12. An electrochemical energy conversion system in accordance with claim 11, wherein the source of electricity is at least one of a source of DC electricity, a wall outlet, or an energy storage device.

13. An electrochemical energy conversion system in accordance with claim 1, further comprising a source of water.

14. An electrochemical energy conversion system in accordance with claim 13, wherein the source of water is at least one of an onboard storage tank or a household source of water.

15. An electrochemical energy conversion system comprising:
a storage tank for a source of organic liquid carrier of hydrogen;
a PEM fuel cell comprising a solid electrolyte, in fluid communication with the storage tank and an oxidant, for receiving, catalyzing and electrochemically oxidizing at least a portion of the hydrogen to generate electricity, a hydrogen depleted liquid, and water;
a vessel for receiving the hydrogen depleted liquid;
a recharging component for connecting the electrochemical conversion system
to a source of electricity for rehydrogenating the hydrogen depleted liquid across the
electrochemical energy conversion; and
a source of water;
wherein the organic liquid carrier of hydrogen comprises at least two secondary
hydroxy groups represented by the following structure

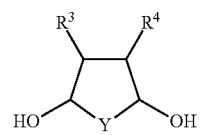

wherein $R^3$ and $R^4$ are independently hydrogen, a $C_1$-$C_6$ ahphatic radical, a $C_5$-$C_{12}$ cycloahphatic radical, or a $C_6$-$C_{12}$ aromatic radical; and Y is oxygen, sulfur or NH.

16. An electrochemical energy conversion system in accordance with claim 15 wherein the solid electrolyte is selected from the group consisting of sulfonated polymers, phosphonated polymers, proton conductive ceramics, and composites comprising a proton-conductive ceramic and a polymeric material.

* * * * *